United States Patent
Kim (10) Patent No.: US 8,986,876 B2
(45) Date of Patent: Mar. 24, 2015

(54) CAP ASSEMBLY AND SECONDARY BATTERY HAVING THE SAME

(75) Inventor: Dae-Kyu Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 829 days.

(21) Appl. No.: 12/641,033

(22) Filed: Dec. 17, 2009

(65) Prior Publication Data

US 2010/0159288 A1    Jun. 24, 2010

(30) Foreign Application Priority Data

Dec. 18, 2008    (KR) .................. 10-2008-0129328

(51) Int. Cl.
| | |
|---|---|
| *H01M 2/08* | (2006.01) |
| *H01M 2/04* | (2006.01) |
| *H01M 2/12* | (2006.01) |
| *H01M 10/052* | (2010.01) |

(52) U.S. Cl.
CPC .......... *H01M 2/0413* (2013.01); *H01M 2/1241* (2013.01); *H01M 2/1235* (2013.01); *H01M 2/046* (2013.01); *H01M 2/12* (2013.01); *H01M 10/052* (2013.01); *H01M 2200/00* (2013.01); *H01M 2200/106* (2013.01)
USPC ............................. 429/175; 429/180; 429/174

(58) Field of Classification Search
CPC .. H01M 2/1235; H01M 2/1241; H01M 2/046
USPC .......................................... 429/175, 170, 174
See application file for complete search history.

(56) References Cited

U.S. PATENT DOCUMENTS

| | | | |
|---|---|---|---|
| 2,876,271 A | 3/1959 | Cahoon | |
| 5,580,679 A | 12/1996 | Tanaka | |
| 5,707,756 A | 1/1998 | Inoue | |
| 5,766,793 A * | 6/1998 | Kameishi et al. | 429/62 |
| 6,322,921 B1 * | 11/2001 | Iwaizono et al. | 429/56 |
| 6,537,693 B1 | 3/2003 | Suzuki et al. | |
| 7,618,745 B2 * | 11/2009 | Yamashita et al. | 429/185 |
| 2003/0027038 A1 | 2/2003 | Tsukamoto et al. | |
| 2004/0170887 A1 * | 9/2004 | Masumoto et al. | 429/61 |
| 2005/0074667 A1 | 4/2005 | Yang | |

(Continued)

FOREIGN PATENT DOCUMENTS

| | | |
|---|---|---|
| EP | 1 926 161 | 5/2008 |
| JP | 06-215746 | 8/1994 |

(Continued)

OTHER PUBLICATIONS

EP Search Report for related EP Application No. 09177456.2-2119, Feb. 2, 2010.

(Continued)

*Primary Examiner* — Zachary Best
(74) *Attorney, Agent, or Firm* — Knobbe Martens Olson & Bear LLP (57) ABSTRACT

Provided are a cap assembly for a secondary battery. The cap assembly includes a cap-up, a PTC thermistor disposed under the cap-up, a vent disposed under the PTC thermistor, and an insulating plate disposed between the vent and the cap-up and preventing contact between the vent and the PTC thermistor. Here, the vent includes a curling part bent to cover an external surface of the insulating plate. Further, the secondary battery includes an electrode assembly, a can accommodating the electrode assembly and having an opening, and the cap assembly which seals the can.

20 Claims, 6 Drawing Sheets

(56) References Cited

U.S. PATENT DOCUMENTS

| | | |
|---|---|---|
| 2006/0078787 A1 | 4/2006 | Sato |
| 2006/0093904 A1 | 5/2006 | Cheon et al. |
| 2006/0263676 A1* | 11/2006 | Chang et al. .................... 429/74 |
| 2007/0172728 A1 | 7/2007 | Yamashita et al. |
| 2007/0202364 A1* | 8/2007 | Uh et al. ........................... 429/7 |
| 2009/0061310 A1 | 3/2009 | Kim |
| 2009/0186269 A1 | 7/2009 | Kim et al. |
| 2010/0136388 A1 | 6/2010 | Kim et al. |
| 2010/0143772 A1 | 6/2010 | Byun |
| 2010/0143792 A1 | 6/2010 | Kim |
| 2010/0215997 A1 | 8/2010 | Byun |

FOREIGN PATENT DOCUMENTS

| | | |
|---|---|---|
| JP | 06-215747 | 8/1994 |
| JP | 07-027051 | 5/1995 |
| JP | 07-235288 | 9/1995 |
| JP | 07-254401 | 10/1995 |
| JP | 95-027051 | 8/1996 |
| JP | 08-293295 | 11/1996 |
| JP | 10 340714 | 12/1998 |
| JP | 2000-090912 | 3/2000 |
| JP | 2001-196047 | 7/2001 |
| JP | 2001-351608 | 12/2001 |
| JP | 2002-170531 | 6/2002 |
| JP | 2003-187773 | 7/2003 |
| JP | 2003-217544 | 7/2003 |
| JP | 2004-152697 | 5/2004 |
| JP | 2004-186060 | 7/2004 |
| JP | 2005-174903 | 6/2005 |
| JP | 2006-066269 | 3/2006 |
| JP | 2006-286561 | 10/2006 |
| JP | 2006286561 A * | 10/2006 |
| JP | 2007-207453 | 8/2007 |
| KR | 97-47070 | 7/1997 |
| KR | 1020010056363 | 12/1999 |
| KR | 1020010051870 | 6/2001 |
| KR | 1020010061303 | 7/2001 |
| KR | 1020010101035 | 11/2001 |
| KR | 1020030066243 | 8/2003 |
| KR | 100471966 | 2/2005 |
| KR | 1020070076172 | 1/2006 |
| KR | 102006 002236 | 3/2006 |
| KR | 100579400 | 5/2006 |
| KR | 1020060037595 | 5/2006 |
| KR | 1020050041019 * | 11/2006 |
| KR | 1020060112728 | 11/2006 |
| KR | 1020060118719 | 11/2006 |
| KR | 10-0734758 | 6/2007 |
| KR | 1020070093171 | 9/2007 |
| KR | 1020080007155 | 1/2008 |
| KR | 1020080022945 | 3/2008 |
| KR | 1020080032911 | 4/2008 |
| KR | 1020080043533 | 5/2008 |

OTHER PUBLICATIONS

Notice of Allowability for related Korean Application No. 10-2007-0086143, Nov. 28, 2008.
EP Search Report for corresponding EP Application No. 10153660.5-1227, Jun. 4, 2010.
Hufnagel, W. "Aluminium-Schluessel, Passage", Jan. 1, 1983, Aluminium-Schluessel, Dusseldorf, Aluminium Verlag, DE pp. 76-81 XP002025184.
Office Action dated Aug. 6, 2010 from related KR 10-2008-0129328.

* cited by examiner

CAP ASSEMBLY AND SECONDARY BATTERY HAVING THE SAME

CROSS-REFERENCE TO RELATED APPLICATION

This application claims the benefit of Korean Patent Application No. 10-2008-0129328, filed Dec. 18, 2008, the disclosure of which is hereby incorporated herein by reference in its entirety.

BACKGROUND OF THE INVENTION

1. Field of the Invention

The present invention relates to a cap assembly capable of simplifying a manufacturing process and enhancing sealing performance and safety, and a secondary battery having the same.

2. Description of the Related Art

Secondary batteries can be recharged and repeatedly used even after having been discharged, so that they are widely used as an energy source for electronic devices in various applications.

Although secondary batteries were limited in use to mainly small electronic devices such as MP3s, cameras and PMPs due to small capacity in the past, as the secondary batteries achieve higher capacity and power, they are being designed to be used in hybrid cars and electric-powered tools.

Among these secondary batteries, a lithium secondary battery is widely used in various applications because of a high operating voltage and a high energy density per unit weight.

The lithium secondary battery is formed by accommodating an electrode assembly and an electrolyte in an outer case, and sealing the outer case.

Lithium secondary batteries may be classified into can- and pouch-type batteries according to the shape of the outer case. The can-type battery may be further classified into cylindrical and prismatic batteries.

The cylindrical secondary battery is formed by accommodating an electrode assembly and an electrolyte in a can, and inserting an insulating gasket and a cap assembly into an opening of the can to seal the can.

Generally, in the cylindrical secondary battery, the insulating gasket is inserted into the opening of the can, and components of the cap assembly are inserted into the insulating gasket one by one, and a side surface of the can and the insulting gasket are then crimped to seal the can.

A secondary battery having the conventional cap assembly has a problem of decreased processibility since all components of the cap assembly are inserted individually.

Further, since the components of the cap assembly are simply stacked, the components are often weakly adhered to each other, and thus there is an increased risk of leakage of gases generated in the battery.

SUMMARY OF THE INVENTION

The present invention provides a cap assembly, which can simplify a manufacturing process, and enhance sealing performance and safety of a secondary battery by integrally forming components of a cap assembly.

According to one aspect of the present invention, the cap assembly includes: a cap-up; a PTC thermistor disposed under the cap-up; a vent disposed under the PTC thermistor; and an insulating plate disposed between the vent and the cap-up, and preventing contact between the vent and the PTC thermistor. Here, the vent includes a curling part bent to cover an external surface of the insulating plate.

According to another aspect of the present invention, the secondary battery includes: an electrode assembly including first and second electrode plates having different polarities, and a separator disposed between the first electrode plate and the second electrode plate; a can accommodating the electrode assembly and having an opening; and a cap assembly sealing the can, including a cap-up, a PTC thermistor disposed under the cap-up, a vent disposed under the PTC thermistor and an insulating plate disposed between the vent and the cap-up and preventing contact between the vent and the PTC thermistor. Here, the vent includes a curling part bent to surround an outer surface of the insulating plate.

The insulating plate may include a first insulating part covering a side surface of the cap-up, and a second insulating part extending from the first insulating part and covering an edge of a top surface of the cap-up.

The curling part may include a first curling part covering a side surface of the PTC thermistor and covering the first insulating part, and a second curling part extending from the first curling part and covering the second insulating part.

The PTC thermistor and the cap-up may meet together at ends thereof, and the insulating plate may include a first insulating part covering the side surfaces of the cap-up and the PTC thermistor and a second insulating part extending from the first insulating part and covering the edge of the top surface of the cap-up.

The curling part may include a first curling part covering the first insulating part, and a second curling part extending from the first curling part and covering the second insulating part.

The insulating plate may include a third insulating part extending from the first insulating part disposed between the vent and the PTC thermistor, and the PTC thermistor may include a second groove formed at the position corresponding to the third insulating part, which is disposed on the second groove.

The insulating plate may include a third insulating part extending from the first insulating part and disposed between the vent and the PTC thermistor, and the vent may includes a third groove formed at a position corresponding to the third insulating part, which is disposed on the third groove.

According to another aspect of the present invention, a secondary battery is provided. This secondary battery includes an electrode assembly including first and second electrode plates having different polarities, and a separator disposed between the first electrode plate and the second electrode plate, a can accommodating the electrode assembly and having an opening; and a cap assembly sealing the can, including a cap-up having an edge and a top surface wherein the cap-up defines a first plane, a PTC thermistor disposed under the cap-up, a vent disposed under the PTC thermistor and an insulating plate having an outer surface wherein the insulating plate is disposed between the vent and the cap-up and inhibiting contact between the vent and the cap-up. In this aspect, the vent includes a first portion that extends outward in a second plane substantially parallel to the first plane and a second portion, positioned outward of the first portion in a direction that intersects the first plane and wherein the insulating plate is positioned adjacent the first portion of the vent plate so that the outer surface of the insulating plate is positioned inward of the second portion of the insulating plate the outer surface of the insulating plate.

BRIEF DESCRIPTION OF THE DRAWINGS

The above and other features of the present invention will be described in reference to specific exemplary embodiments thereof with reference to the attached drawings in which.

DETAILED DESCRIPTION OF THE INVENTION

The above and other objects, features and functions of the present invention will be described more fully with reference to accompanying drawings. Moreover, in the drawings, the length and thickness of an element or a region may be exaggerated for clarity. Also, like numerals denote like elements throughout the specification.

Figure 1A:
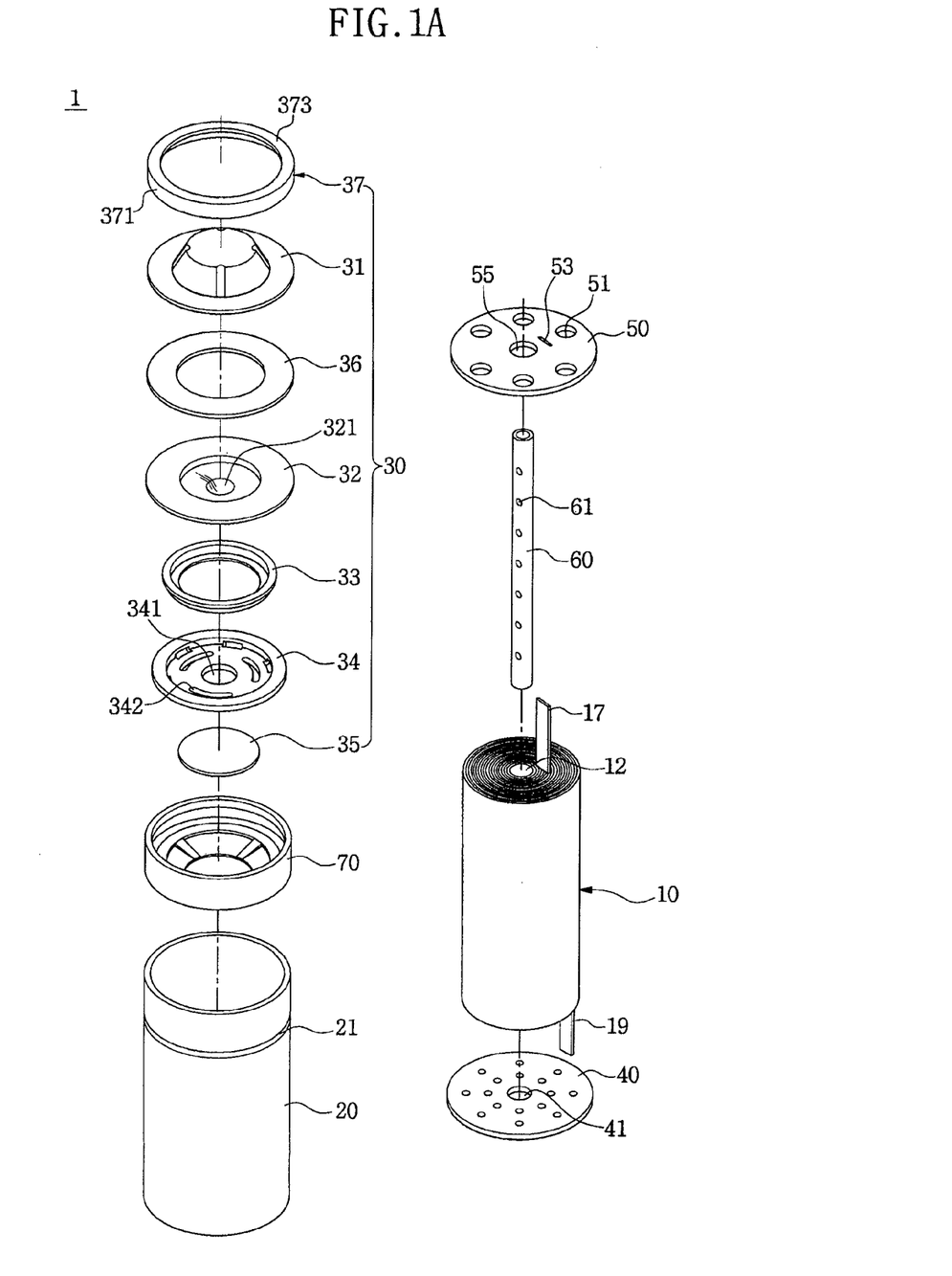
FIG. 1A is an exploded perspective view of a secondary battery according to a first exemplary embodiment of the present invention.
Figure 1B:
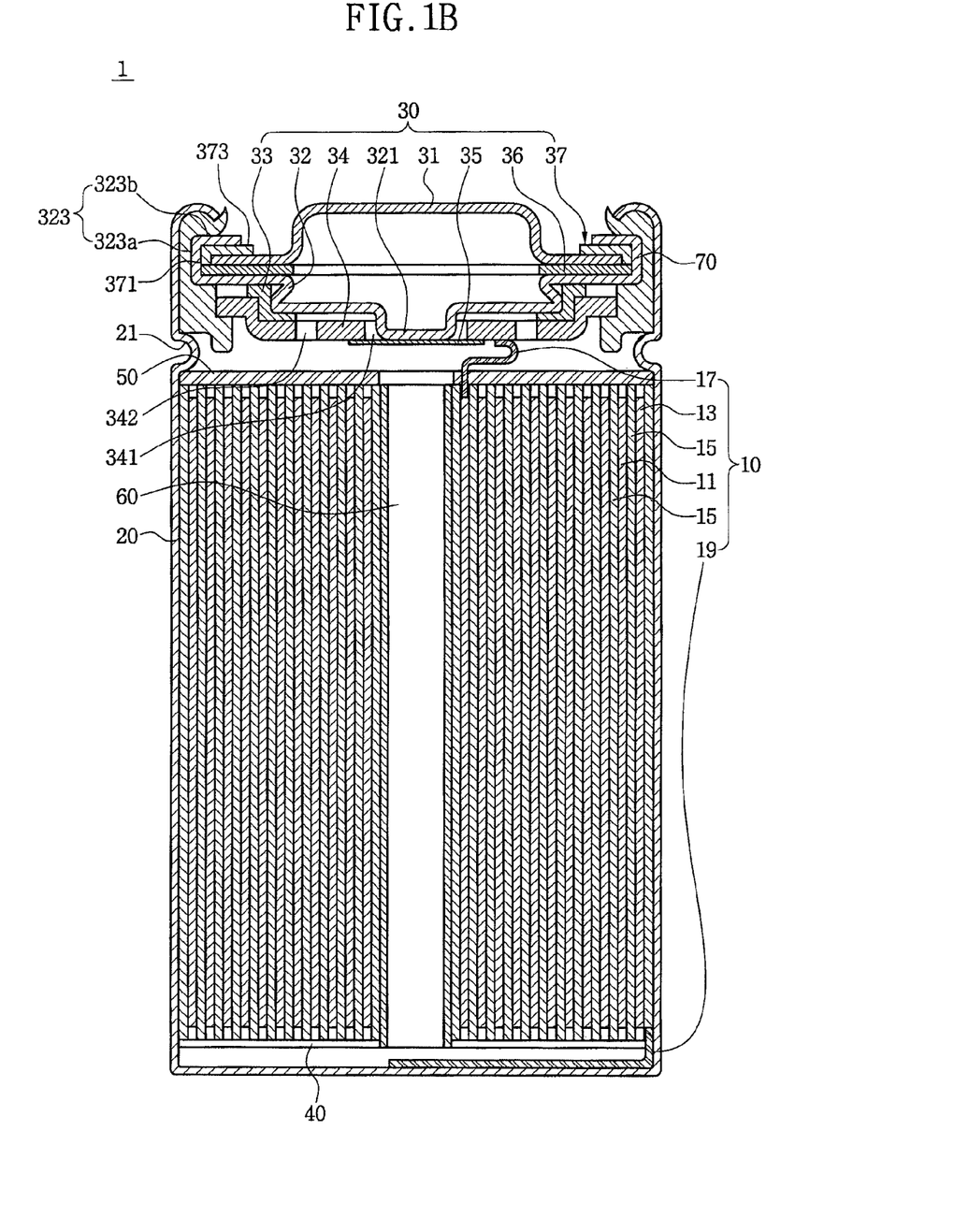
FIG. 1B is an assembled cross-sectional view of the secondary battery of FIG. 1A.

FIG. 1A is an exploded perspective view of a secondary battery according to a first exemplary embodiment of the present invention, and FIG. 1B is an assembled cross-sectional view of the secondary battery of FIG. 1A.

FIGS. 2 to 5 are assembled cross-sectional views of secondary batteries according to second to fifth exemplary embodiments of the present invention.

Referring to FIGS. 1A and 1B, a secondary battery 1 according to a first exemplary embodiment of the present invention includes an electrode assembly 10, a can 20 accommodating the electrode assembly 10, and a cap assembly 30 sealing the can 20.

The secondary battery 1 may further include a lower insulating plate 40, an upper insulating plate 50, a center pin 60 and an insulating gasket 70.

The electrode assembly 10 may include a first electrode plate 11, a second electrode plate 13 which has a different polarity from the first electrode plate 11, and a separator 15 disposed between the first and second electrode plates 11 and 13 to prevent a short circuit therebetween.

The electrode assembly 10 may be formed in a jelly roll shape by stacking and then winding the first and second electrode plates 11 and 13 and the separator 15.

Accordingly, the electrode assembly 10 is formed in a cylindrical shape, and has a center-hole 12 that is a space having a predetermined size in its center.

The first and second electrode plates 11 and 13 are formed by applying a positive electrode active material slurry or a negative electrode active material slurry to a collector plate made of aluminum or copper.

Generally, the positive electrode active material slurry is applied to the collector plate made of aluminum to form a positive electrode plate, and the negative electrode active material slurry is applied to the collector plate made of copper to form a negative electrode plate.

The first and second electrode plates 11 and 13 include non-coating portions to which the slurry is not applied and first and second electrode tabs 17 and 19 are electrically connected to the non-coating portions, respectively.

That is, the first electrode tab 17 is connected to the non-coating portion formed on the first electrode plate 11, and the second electrode tab 19 is connected to the non-coating portion formed on the second electrode plate 13.

One of the first and second electrode tabs 17 and 19 is led upward from the electrode assembly 10 to face an opening of the can 20, and the other is led downward from the electrode assembly 10 to face a bottom of the can 20.

Alternatively, the first and second electrode tabs 17 and 19 may be led out to the same direction depending on the process of manufacturing a battery.

In the exemplary embodiment, the first electrode tab 17 is led upward from the electrode assembly 10, and the second electrode tab 19 is led downward from the electrode assembly 10.

The can 20 may be formed of a metal such as aluminum or stainless steel, and formed in a cylindrical shape having an opening at one side, into which the electrode assembly 10 is inserted.

A bead 21 formed by bending an upper side surface of the can 20 inwardly is disposed, and formed adjacent to a top surface of the electrode assembly 10 in order to prevent vertical movement of the electrode assembly 10 inserted into the can 20.

As described in the exemplary embodiment, when the upper insulating plate 50 is disposed on the electrode assembly, the bead 21 may be formed adjacent to a top surface of the upper insulating plate 50.

The lower insulating plate 40 may be disposed on a bottom surface of the electrode assembly 10 to prevent a short circuit between the can 20 and the electrode assembly 10 and absorb an external impact.

The lower insulating plate 40 includes a through-hole 41 corresponding to the center-hole 12 in the electrode assembly 10.

The second electrode tab 19 is bent toward the center of the electrode assembly 20 to cross the center-hole 12 of the electrode assembly 10 and the through-hole 41 of the lower insulating plate 40, and welded to a bottom surface of the can 20.

The welding of the second electrode tab 19 to the bottom surface of the can 20 is performed using a welding rod inserted through the center-hole 12 and the through-hole 41.

Therefore, the can 20 may have the same polarity as the second electrode tab 19, and serve as an electrode terminal.

The upper insulating plate 50 may be disposed on the electrode assembly 10 inserted into the can 20, and a center pin 60 may be inserted through the center-hole 12 of the electrode assembly 10.

The upper insulating plate 50 may include a plurality of first holes (electrolyte injection holes; 51) to provide a pathway allowing the injected electrolyte to flow into the electrode assembly 10.

In addition, the upper insulating plate 50 may include a second hole (an electrode tab leading hole; 53) formed to lead out the first electrode tab 17, and a third hole (a center pin insertion hole; 55) corresponding to the center-hole 12 of the electrode assembly 10 through which the center pin 60 is inserted.

The center pin 60 serves to prevent deformation of the electrode assembly 10 due to an external pressure, and exhaust an inner gas generated from the electrode assembly 10.

The center pin 60 may be formed in a hollow pipe shape to facilitate the exhaustion of the inner gas, and have a plurality of holes (gas exhaustion holes; 61) in the side thereof to further facilitate gas exhaustion.

The center pin 60 may include caps coupled to opened top and bottom ends thereof, and the caps may be formed of a material melting at a reference temperature, so that the center pin 60 serves as a pathway for gas exhaustion after the caps melt.

The insulating gasket 70 may be coupled to an inner side surface of a top of the can 10 through the opening of the can 10, and formed of an insulating and elastic material.

The insulating gasket 70 is disposed between the can 20 and the cap assembly 30 to insulate the can 20 from the cap assembly 30 having a different polarity from the can 20, and seals the can 20 together with the cap assembly 30.

The cap assembly 30 is inserted into the insulating gasket 70, and includes a cap-up 31 serving as an electrode terminal, and a vent 32, an insulating member 33, a cap-down 34 and a sub-plate 35, which are sequentially disposed under the cap-up 31.

The cap assembly 30 further includes a PTC thermistor 36 disposed between the cap-up 31 and the vent 32, and may enhance electrical safety to high temperature.

The PTC thermistor 36 is disposed under the cap-up 31, and the vent 32 is disposed under the PTC thermistor 36.

The cap assembly 30 includes an insulating plate 37 disposed between the cap-up 31 and the vent 32 to prevent contact between the vent 32 and the cap-up 31, and the insulating plate 37 is formed of an insulating and elastic material surrounding the cap-up 31.

The vent 32 includes a protrusion 321 approximately formed in the middle thereof, and the protrusion 321 is formed in a lower direction of the cap assembly 30, that is, toward the electrode assembly 10 accommodated in the can 20.

The insulating plate 37 is formed to surround the circumference of the cap-up 31, and includes a first insulating part 371 covering a side surface of the cap-up 31, and a second insulating part 373 extending from the first insulating part 371 and covering an edge of a top surface of the cap-up 31. As a result, the insulating plate 37 is formed in a ring shape.

An edge of the vent 32 includes a curling part 323, which is bent to surround an outer surface of the insulating plate 37 disposed thereon. The curling part 323 also surrounds a side surface of the PTC thermistor 36.

Accordingly, the curling part 323 includes a first curling part 323a covering the side surface of the PTC thermistor 36 and the first insulating part 371, and a second curling part 323b extending from the first curling part 323a and covering the second insulating part 373.

In one implementation, the vent plate 32 defines a first portion that extends outward in the plane that is substantially parallel to the plane of the cap-up 31. The vent plate 32 also defines a second portion that that extends in a direction that intersects the plane of the cap-up 31 so as to extend around the end of the insulating plate 37. The vent plate 32 also defines a third portion that is coupled to the second portion and extends in over the top of the insulating plate 37 in a plane that is substantially parallel to the plane of the cap-up 31. In one implementation, the second and third portions comprise the bent curling parts. It will, however, be appreciated that the portions can also be formed by attachment of components without departing from the spirit of the present invention.

The insulating plate 37 is disposed between the cap-up 31 and the vent 32. More specifically, the insulating plate 37 is disposed between the cap-up 31 and the curling part 323 of the vent 32, and prevents contact between the cap-up 31 and the vent 32.

The cap-up 31, the PTC thermistor 36 and the insulating plate 37 are coupled together by the vent 32 including the curling part 323 to have a unified form.

That is, the cap-up 31, the PTC thermistor 36 and the insulating plate 37 are not independently inserted, but inserted in the unified form into the insulating gasket 70. Thus, the present invention can simplify a manufacturing process.

When the cap-up 31 is in contact with the vent 32, the PTC thermistor 36 disposed between the cap-up 31 and the vent 32 cannot properly function.

That is, the PTC thermistor 36 is increased in resistance at high temperatures, thereby interrupting current flow, and thus is provided to enhance safety at high temperatures.

Accordingly, the current flow can be controlled by the PTC thermistor 36 when a current path is formed along the vent 32, the PTC thermistor 36 and the cap-up 31.

However, when the insulating plate 37 is not disposed between the cap-up 31 and the vent 32, the cap-up 31 and the vent 32 are in contact with each other due to the curling part 323. Thus, a current path is formed only along the vent 32 and the cap-up 31, not through the PTC thermistor 36, instead of the above-mentioned current path formed along the vent 32, the PTC thermistor 36 and the cap-up 31.

For this reason, the PTC thermistor 36 cannot properly function and ensure electrical safety.

In order to prevent these problems, the cap assembly 30 includes the insulating plate 37 preventing contact between the vent 32 and the cap-up 31.

When a vent is bent to form the curling part 323, a crack may be generated at the bending portion. However, since there is the insulating layer 37 formed of an elastic material, adhesion between the cap-up 31, the vent 32 and the PTC thermistor 36 may be increased by applying high pressure during the formation of the curling part 323, resulting in preventing leakage of a gas generated from the battery and increasing sealing performance.

Figure 2:
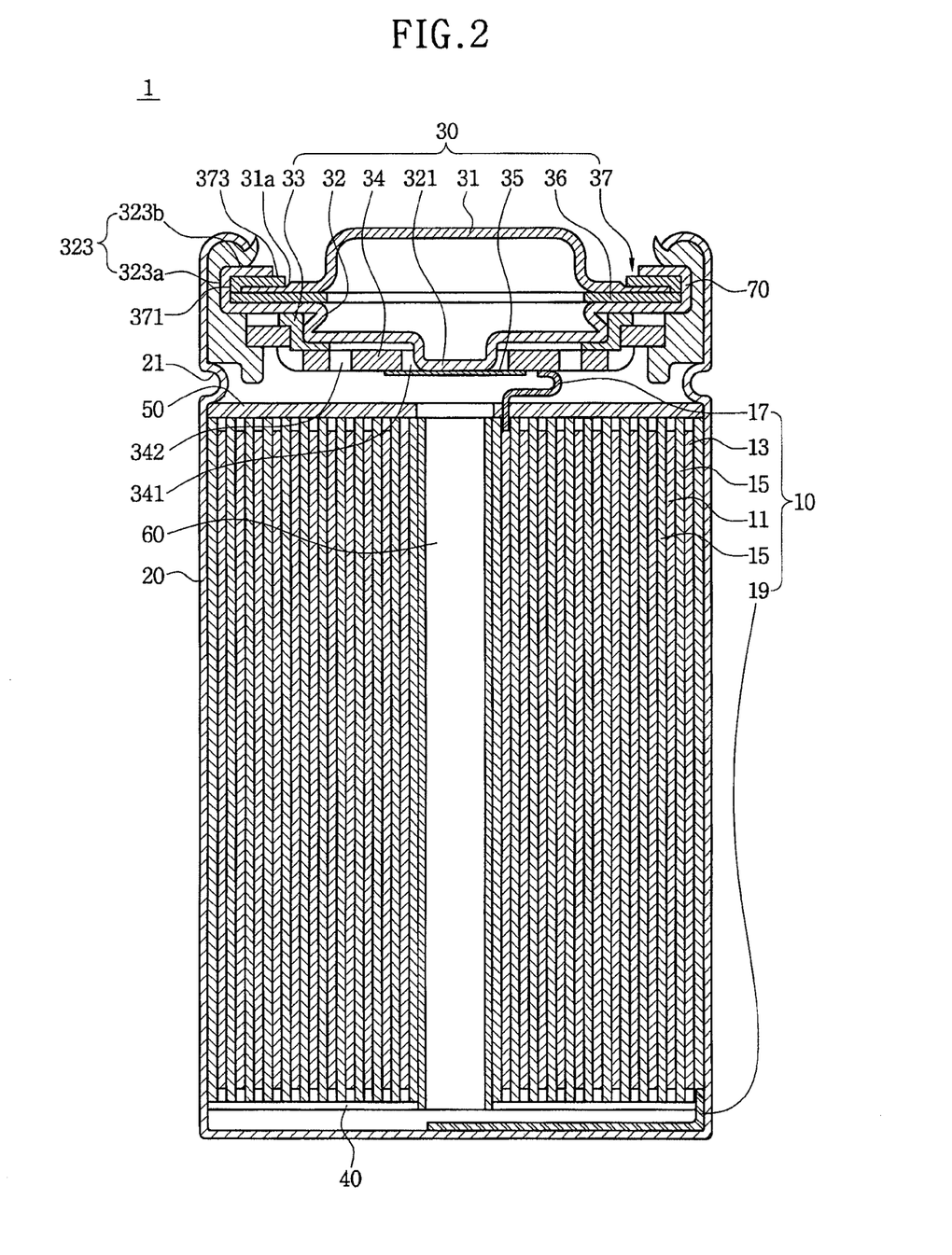
FIGS. 2 to 5 are assembled cross-sectional views of secondary batteries according to second to fifth exemplary embodiments of the present invention.

Referring to FIG. 2, a first groove 31a is formed in an end of the top surface of the cap-up 31, and the second insulating part 373 of the insulating plate 37 is disposed on the first groove 31a, resulting in a decrease in thickness.

Figure 3:
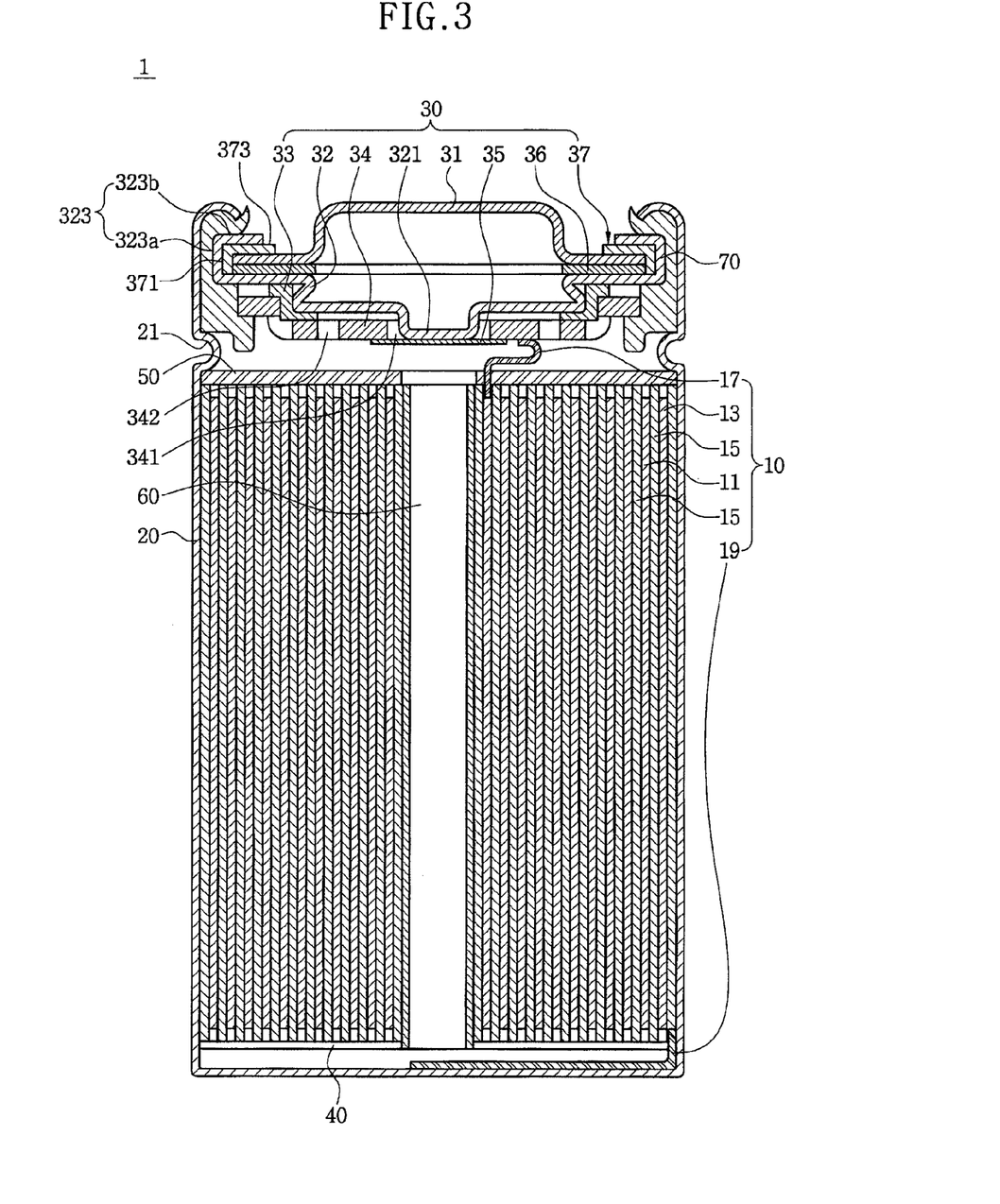

Referring to FIG. 3, the PTC thermistor 36 and the cap-up 31 meet each other at ends thereof, and the first insulating part 371 of the insulating plate 37 may be further extended to cover the side surface of the PTC thermistor 36.

The insulating plate 37 includes the first insulating part 371 covering the side surfaces of the PTC thermistor 36 and the cap-up 31, and the second insulating part 373 extending from the first insulating part 371 and covering an edge of the top surface of the cap-up 31.

The first curling part 323a of the curling part 323 covers the first insulating part 371, and the second curling part 323b extends from the first curling part 323a and covers the second insulating part 373.

Accordingly, the first insulating part 371 is disposed between the side surface of the PTC thermistor 36 and the first curling part 323a, and between the side surface of the cap-up 31 and the first curling part 323a.

As a result, cross-sections of the insulating plates 37 shown in FIGS. 1 and 3 have a 'ㄷ' or 'ㄱ' shape (e.g., inverted "L" shape or backwards inverted "L" shape).

Figure 4:
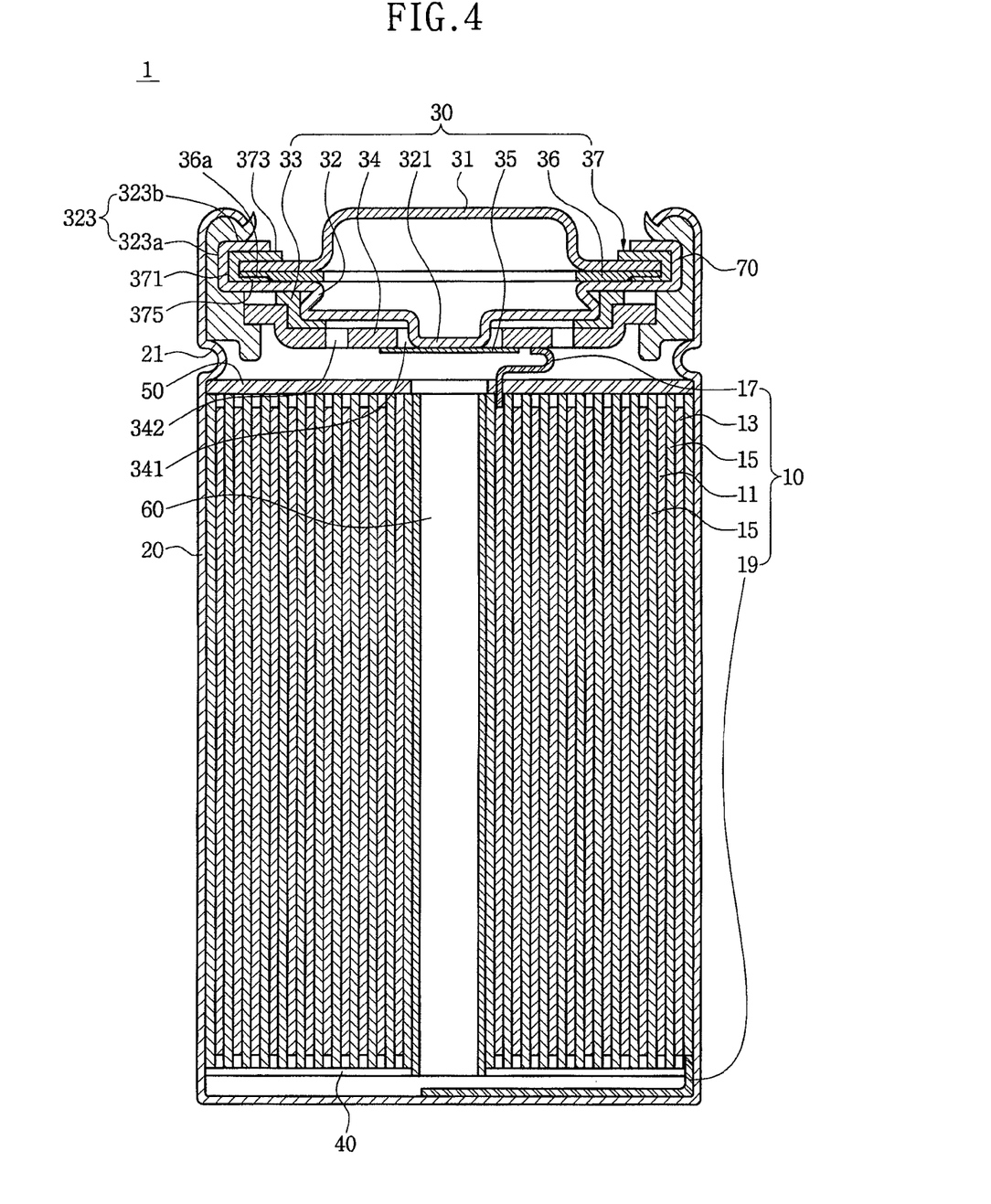

Referring to FIG. 4, the insulating plate 37 includes a third insulating part 375 extending from the first insulating part 371 and disposed between the vent 32 and the PTC thermistor 36, and the PTC thermistor 36 includes a second groove 36a formed at the position corresponding to the third insulating part 375. The third insulating part 375 may be disposed on the second groove 36a, and the second groove 36a may be formed at an outer end of the bottom surface of the PTC thermistor 36.

Figure 5:
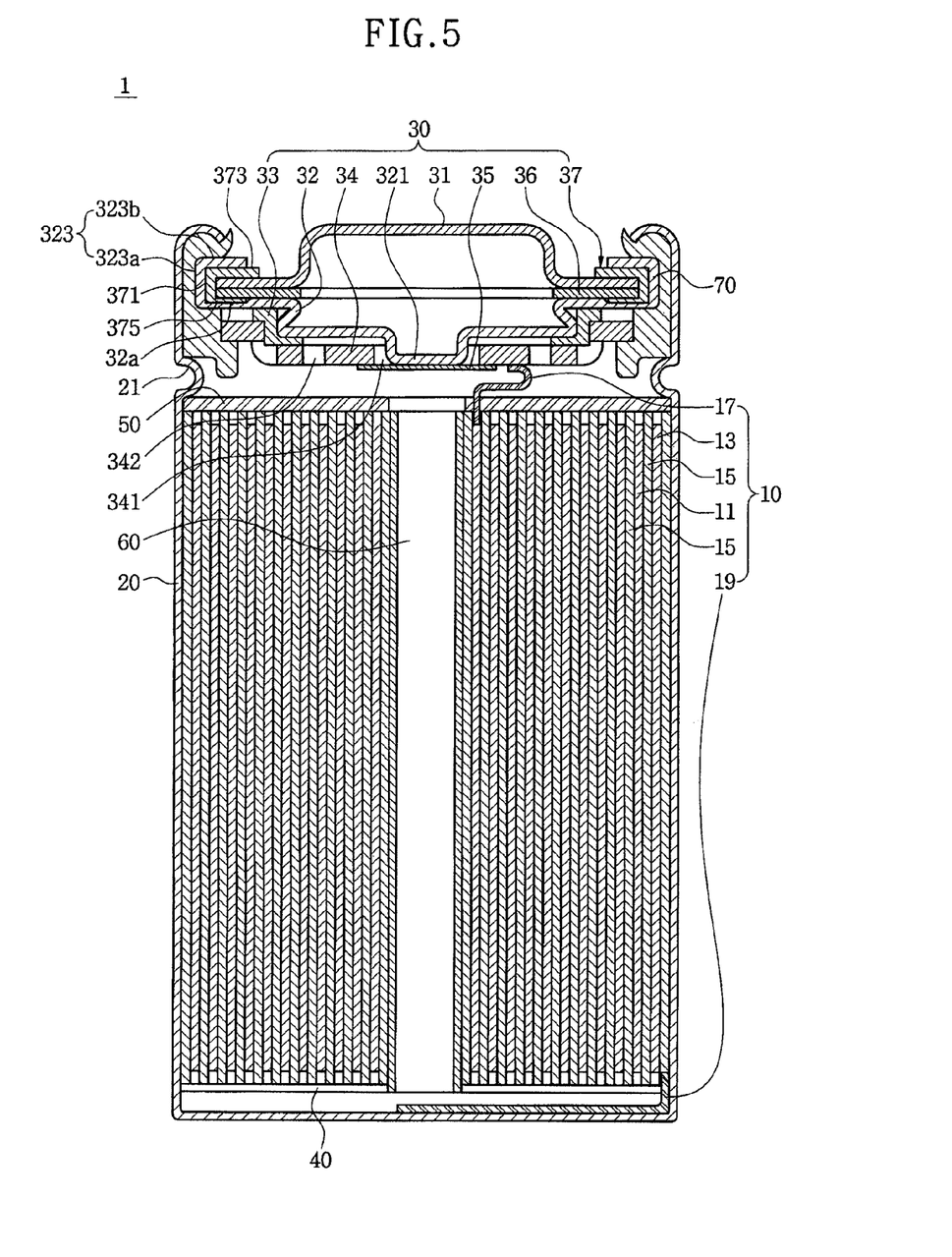

Referring to FIG. 5, the vent 32 may include a third groove 32a formed at the position corresponding to the third insulating part 375 of the insulating plate 37, and the third insulating part 375 may be disposed on the third groove 32a, which may be formed to a predetermined length toward the center of the vent 32 from a starting point of the first curling part 323a.

As a result, cross-sections of the insulating plates 37 shown in FIGS. 4 and 5 have a '⊂' or '⊃' shape (e.g., "C" shape or backwards "C" shape).

Though the cap-ups 31 shown in FIGS. 3 to 5 do not have the first groove 31a, they may be selectively formed in secondary batteries shown in FIGS. 3 to 5 by those skilled in the art, and may have a reduced thickness.

The cap-down 34 includes a first hole 341 formed in the center thereof to correspond to the protrusion 321 of the vent 32.

In addition, when an inner pressure of the battery is increased, the cap-down 34 includes a plurality of second holes 342 through which gases can pass to apply the pressure to the bottom surface of the vent 32.

The insulating member 33 is disposed between the vent 32 and the cap-down 34 to prevent contact between the two components 32 and 34.

The sub-plate 35 may be formed in a circular sheet, disposed on a first hole 341 of the cap-down 34 to be exposed, and in electrical contact with the cap-down 34 by laser welding.

The protrusion 321 of the vent 32 is in electrical contact with the sub-plate 35 by welding through the first hole 341 of the cap-down 34.

The first electrode tab 17 of the electrode assembly 10 may be connected to the bottom surface of the cap-down 34 by welding, and the first electrode tab 17 may be connected to the bottom surface of the sub-plate 35.

Consequently, a vent, a PTC thermistor, an insulating plate and a cap-up are not inserted individually, but inserted after they are coupled together to have a united form, and thus a manufacturing process can be simplified.

Further, the vent, the PTC thermistor, the insulating plate and the cap-up are more closely disposed, thereby preventing leakage of a gas generated from a battery and enhancing sealing performance.

The above components including the PTC thermistor are unified, resulting in enhancing electrical safety to high temperature.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cap assembly, comprising:
a cap-up having a bottom surface;
a positive temperature coefficient (PTC) thermistor including an upper surface being in contact with the bottom surface of the cap-up;
a vent disposed under the PTC thermistor, the vent including a curling part bent to cover an outer edge of an upper surface of the cap-up; and
an insulating plate configured to fill a space between the curling part of the vent and the cap-up, the insulating plate including an insulating and elastic material,
wherein the curling part of the vent includes a first curling part being in contact with an entire side of the insulating plate and an entire side of the PTC thermistor, and a second curling part being in contact with an upper surface of the insulating part.

2. The cap assembly according to claim 1, wherein the insulating plate includes:
a first insulating part disposed between the first curling part of the curling part of the vent and a side of the cap-up; and
a second insulating part disposed between the second curling part of the curling part of the vent and an upper surface of an outer edge of the cap-up,
wherein the first insulating part is in contact with an entire side of the cap-up and the second insulating part is in contact with the outer edge of the upper surface of the cap-up.

3. The cap assembly according to claim 2, wherein the upper surface of the cap-up includes a first groove disposed at an area which is in contact with the second insulating part.

4. The cap assembly according to claim 2, wherein a surface of the PTC thermistor vertically aligns with the surface of the cap-up, and the first insulating part fills a space between the curling part of the vent and the surfaces of the PTC thermistor.

5. The cap assembly according to claim 4, wherein the insulating plate further includes a third insulating part disposed between a bottom surface of the PTC thermistor and the vent, and the third insulating part is extended from the first insulating part.

6. The cap assembly according to claim 5, wherein the bottom surface of the PTC thermistor includes a second groove overlapping the first groove, and the third insulating part is disposed on the second groove.

7. The cap assembly according to claim 5, wherein a surface of the vent facing the bottom surface of the PTC thermistor includes a third groove overlapping the first groove, and the third insulating part is disposed on the third groove.

8. The cap assembly according to claim 1, further comprising:
an insulating member disposed under the vent;
a cap-down disposed under the insulating member; and
a sub-plate disposed under the cap-down.

9. The cap assembly according to claim 1, wherein the insulating plate is a ring shape surrounding a circumference of the cap-up.

10. A secondary battery, comprising:
an electrode assembly including first and second electrode plates having different polarities, and a separator disposed between the first electrode plate and the second electrode plate;
a can accommodating the electrode assembly and having an opening; and
a cap assembly sealing the can, wherein the cap assembly includes a cap-up, an insulating plate being directly in contact with an entire side of a PTC thermistor and an upper surface of an outer edge of the cap-up, the PTC thermistor including an upper surface being directly in contact with a bottom surface of the cap-up, and a vent disposed under the PTC thermistor,
wherein the vent includes a first portion being directly in contact with an entire side of the insulating plate, and a second portion, being directly in contact with an upper surface of the insulating plate,
wherein the insulating plate includes an insulating and elastic material, and
wherein the lower surface of the PTC thermistor is directly in contact with the vent.

11. The secondary battery according to claim 10, further comprising:
a lower insulating plate disposed under the electrode assembly;
an upper insulating plate disposed on the electrode assembly;
a center pin inserted into a center-hole of the electrode assembly; and an insulating gasket coupled to an inner surface of a top of the can.

12. The secondary battery according to claim 10, wherein the insulating plate includes:
   a first insulating part disposed between the side of the cap-up and the first portion of the vent; and
   a second insulating part disposed between the upper surface of the outer edge of the cap-up and the second portion of the vent,
   wherein the second insulating part is extended from the first insulating part.

13. The secondary battery according to claim 12, wherein the upper surface of the outer edge of the cap-up includes a first groove and the second insulating part is disposed on the first groove.

14. The secondary battery according to claim 10, wherein a side of the PTC thermistor spaces apart from the first portion of the vent, and the first insulating part is directly in contact with the side of the PTC thermistor.

15. The secondary battery according to claim 14, wherein the insulating plate includes a third insulating part extending from the first insulating part, and disposed between the vent and the bottom surface of PTC thermistor, and wherein the bottom surface of the PTC thermistor includes a second groove disposed at the position corresponding to the third insulating part, which is disposed on the second groove.

16. The secondary battery according to claim 15, wherein the second groove is disposed at an outer end of the bottom surface of the PTC thermistor.

17. The secondary battery according to claim 14, wherein the insulating plate includes a third insulating part extending from the first insulating part, and disposed between the vent and the PTC thermistor, and the vent includes a third groove disposed at the position corresponding to the third insulating part, which is disposed on the third groove.

18. The secondary battery according to claim 17, wherein the third groove extends toward a center of the vent from the first portion of the vent.

19. The secondary battery according to claim 10, further comprising:
   an insulating member disposed under the vent;
   a cap-down disposed under the insulating member; and
   a sub-plate disposed under the cap-down.

20. The secondary battery according to claim 10, wherein the insulating plate is a ring shape surrounding a circumference of the cap-up.

* * * * *